US006962742B2

(12) United States Patent
Chen

(10) Patent No.: US 6,962,742 B2
(45) Date of Patent: Nov. 8, 2005

(54) PATTERN CARD

(76) Inventor: Teng-Kuei Chen, 11 Fl., No. 63, Lane 122, Sec. 4, Jen-Ai Rd., Taipei (TW)

( * ) Notice: Subject to any disclaimer, the term of this patent is extended or adjusted under 35 U.S.C. 154(b) by 0 days.

(21) Appl. No.: 10/796,186

(22) Filed: Mar. 10, 2004

(65) Prior Publication Data

US 2005/0202220 A1 Sep. 15, 2005

(51) Int. Cl.[7] ........................... B32B 27/14; B32B 3/00

(52) U.S. Cl. ................... 428/195.1; 428/570; 428/577; 428/457; 428/537.5; 428/542.2; 428/913.3

(58) Field of Search ............................ 428/195.1, 570, 428/577, 457, 537.5, 542.2, 913.3

(56) References Cited

U.S. PATENT DOCUMENTS

| | | | | |
|---|---|---|---|---|
| 3,043,732 A * | 7/1962 | Shepherd, Jr. | .............. | 156/230 |
| 5,344,808 A * | 9/1994 | Watanabe et al. | ........... | 503/227 |
| 5,575,507 A * | 11/1996 | Yamauchi et al. | ............ | 283/86 |
| 5,718,523 A * | 2/1998 | Shiina et al. | .......... | 400/120.04 |
| 5,806,999 A * | 9/1998 | Kobayashi | .................. | 400/188 |
| 5,956,067 A * | 9/1999 | Isono et al. | ................. | 347/176 |
| 6,280,553 B1 * | 8/2001 | Yang | .......................... | 156/235 |
| 6,699,397 B1 * | 3/2004 | Chen | ........................... | 216/54 |
| 2004/0035713 A1 * | 2/2004 | Chen | .......................... | 205/164 |

* cited by examiner

*Primary Examiner*—B. Shewareged
(74) *Attorney, Agent, or Firm*—Troxell Law Office, PLLC

(57) ABSTRACT

A pattern card has a base material being composed of a paper sheet and a color texture layer printed on the paper sheet. A wax layer is formed on the base material. A protection printing ink is coated on the wax layer. A picture printing ink is partially coated on the protection printing ink according to a designed picture's profile and contour. The protection printing ink and the picture can be mixed with wax in the proportion of 10%. Whereby, it is easy to remove the protection and picture printing ink by a drawknife, and a pattern or picture with a three-dimensional effect appears.

9 Claims, 5 Drawing Sheets

PATTERN CARD

BACKGROUND OF THE INVENTION

1. Field of the Invention

The present invention relates to a pattern card, and more particularly a pattern card on which a pattern or picture with a three-dimensional effect can appear by easily removing printing ink on a base material.

2. Description of Related Art

A pattern or picture will appear on a pattern when a user removes partial material on the pattern card according to a predetermined design.

With reference to FIG. 7, a first conventional pattern card is composed of an aluminum or copper plate (60), and dark paint (61) coated on the aluminum or copper plate (60). When a user removes the dark paint (61) by a drawknife according to the predetermined design, a pattern or picture appears.

However, because there is a high level of adhesion between the dark paint (61) and the aluminum or copper plate (60), and the dark paint (61) has a high level of cohesion in itself, it is very difficult for the user to remove the dark paint (61). Furthermore, the pattern or picture only appears with a color of silver or copper after the aluminum or copper is removed, so the pattern card's decorative effect is monotonous and uninteresting.

As illustrated in FIG. 8, a second conventional pattern card is composed of a paper sheet (70), an aluminum or copper film (71), and dark printing ink (72) coated on the aluminum or copper film (71). Because there is a high level of adhesion between the dark printing ink (72) and the aluminum or copper film (71), and the dark painting ink (72) has a high level of cohesion in itself, this pattern card has the same problems as mentioned above.

With reference to FIG. 9, a third conventional pattern card is composed of a paper sheet (80), an aluminum or copper film (81), dark printing ink (82), and picture printing ink (83) applied on the dark printing ink (82). Because there are high levels of adhesion among the dark printing ink (82), the picture printing ink (83) and the aluminum or copper film (81), and the dark printing ink (82) and picture printing ink (83) have a high level of cohesion in themselves, this pattern card has the same problems as mentioned above.

Therefore, the invention provides an improved pattern card to mitigate or obviate the aforementioned problems.

SUMMARY OF THE INVENTION

The main objective of the present invention is to provide a pattern card on which a pattern or picture with a three-dimensional effect can appear by easily removing printing ink on a base material.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
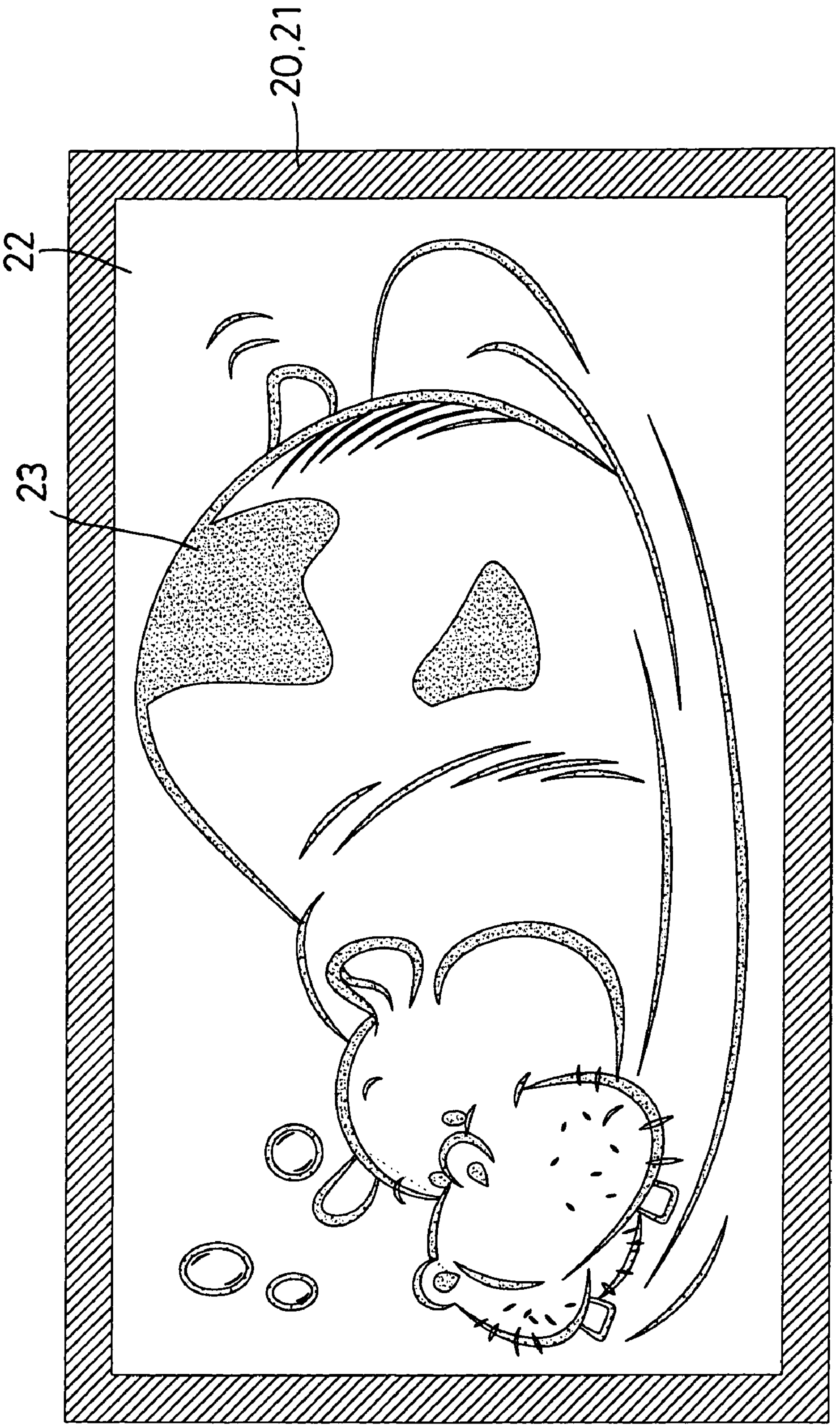
FIG. 1 is a top view of a pattern card in accordance with the present invention.
Figure 9:
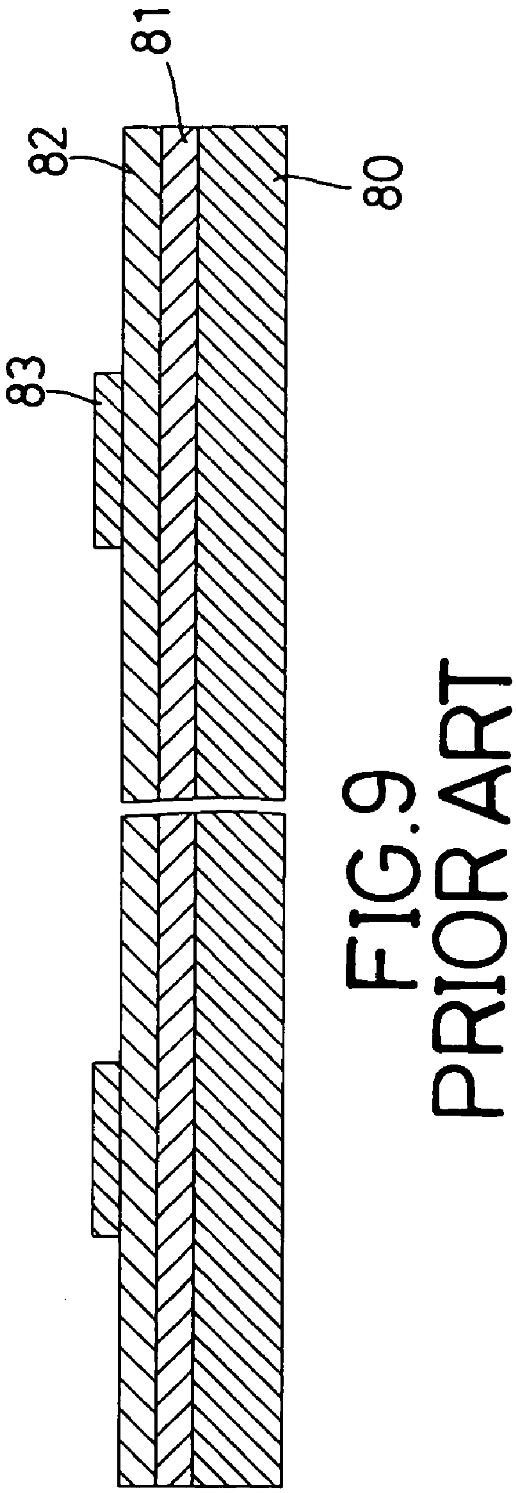
FIG.9 PRIOR ART
FIG. 9 is a cross sectional view of a third conventional pattern card.
Figure 2:
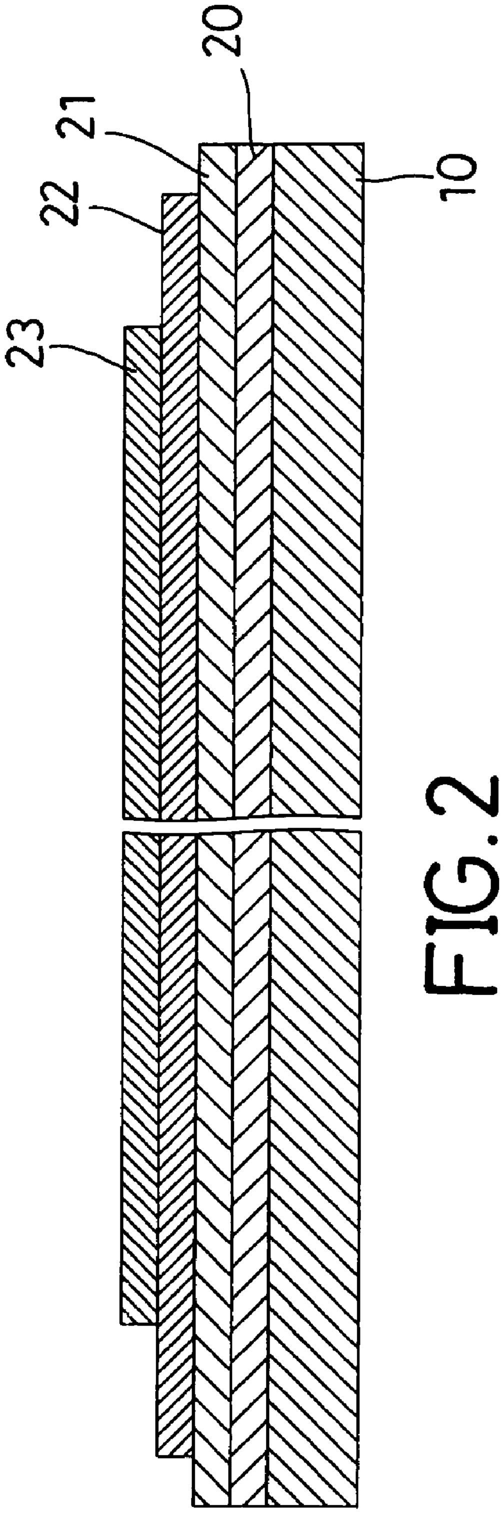
FIG. 2 is a cross sectional view of a first embodiment of the pattern card of the invention.

With reference to FIGS. 1–2, a pattern card in accordance with the present invention has a paper sheet (10). A color texture layer (20) with regular or irregular patterns is printed on the paper sheet (10). The paper sheet (10) and the color texture layer (20) constitute a base material (not numbered). A wax layer (21) is formed on the color texture layer (20). A protection printing ink (22) is coated on the wax layer (21), and a picture printing ink (23) is partially coated on the protection printing ink (22) according to the designed picture's profile and contour. Alternatively, the picture printing ink (23) can be randomly coated on the protection printing ink (22) for a user to freely design the picture. Because the wax layer (21) is between the protection printing ink (22) and picture printing ink (23) to reduce the adhesion of the printing ink (22, 23), it is very easy for the user to remove the printing ink (22, 23).

The protection printing ink (22) and picture printing ink (23) can be mixed with wax in the proportion of 10% for reducing the cohesion of the printing ink (22, 23), so the protection printing ink (22) and picture printing ink (23) can be removed more easily.

In use, the user removes the picture printing ink (23) by moving a drawknife along the picture's profile and contour, and removes the protection printing ink (22) as well, so the designed picture appears on the color texture layer (20) with a three-dimensional effect The picture can be drawn as an animal such as a hippo or dolphin etc., as shown in FIG. 1.

Figure 3:
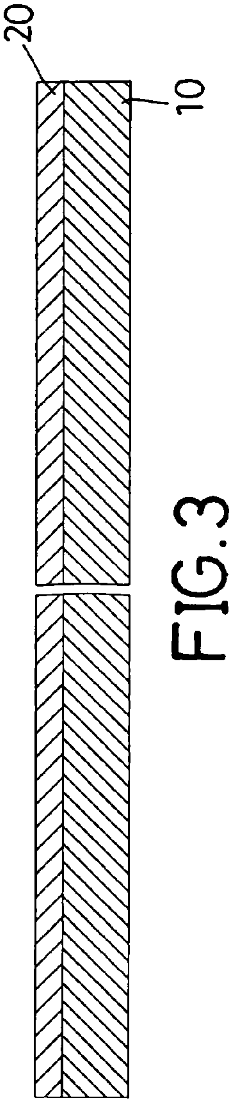
FIG. 3 is a cross sectional view of a second embodiment of a base material of the pattern card of the invention.
Figure 4:
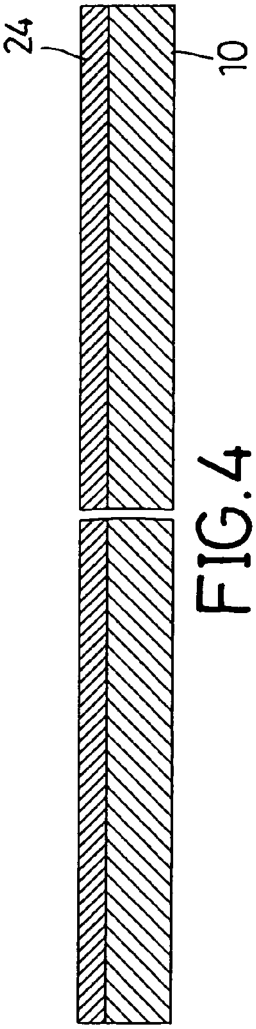
FIG. 4 is a cross sectional view of a third embodiment of a base material of the pattern card of the invention.

The base material in accordance with the present invention has various configurations. With reference to FIG. 3, the base material is composed of the paper sheet (10) and the color texture layer (20). In another embodiment, as shown in FIG. 4, the base material is composed of the paper sheet (10) and a metal film (24) such as aluminum or copper film. The wax layer (21), protection printing ink (22), and picture printing ink (23) can be in turn provided on the metal film (24). The protection printing ink (22) and picture printing ink (23) also can be mixed with wax in the proportion of 10%. When the protection printing ink (22) and picture printing ink (23) are removed, the picture with metallic luster appears on the metal film (24). Alternatively, the picture printing ink (23) can be eliminated, and the user can freely draw on the protection printing ink (22).

Figure 5:
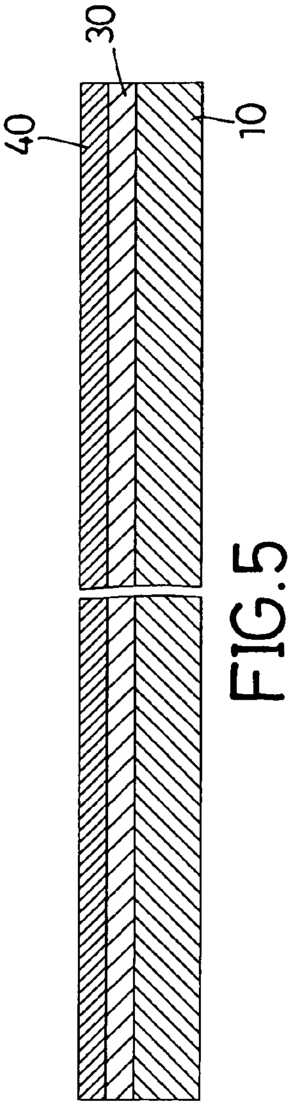
FIG. 5 is a cross sectional view of a fourth embodiment of a base material of the pattern card of the invention.
Figure 6:
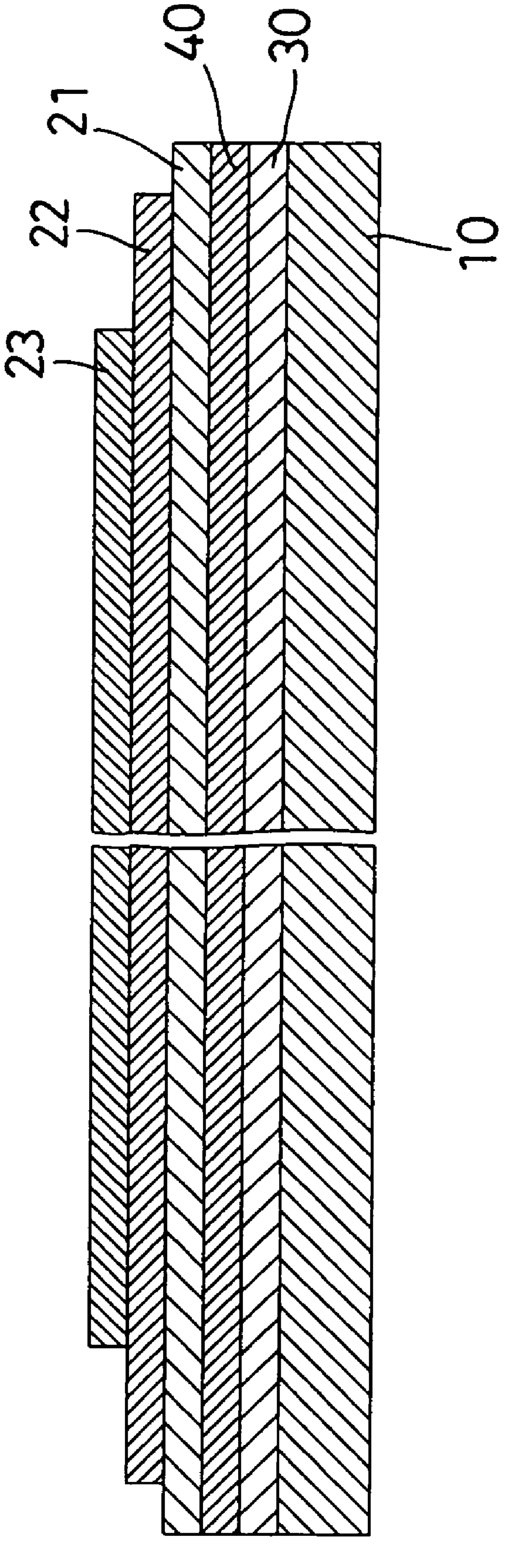
FIG. 6 is a cross sectional view of the fourth embodiment of the pattern card of the invention.
Figure 7:
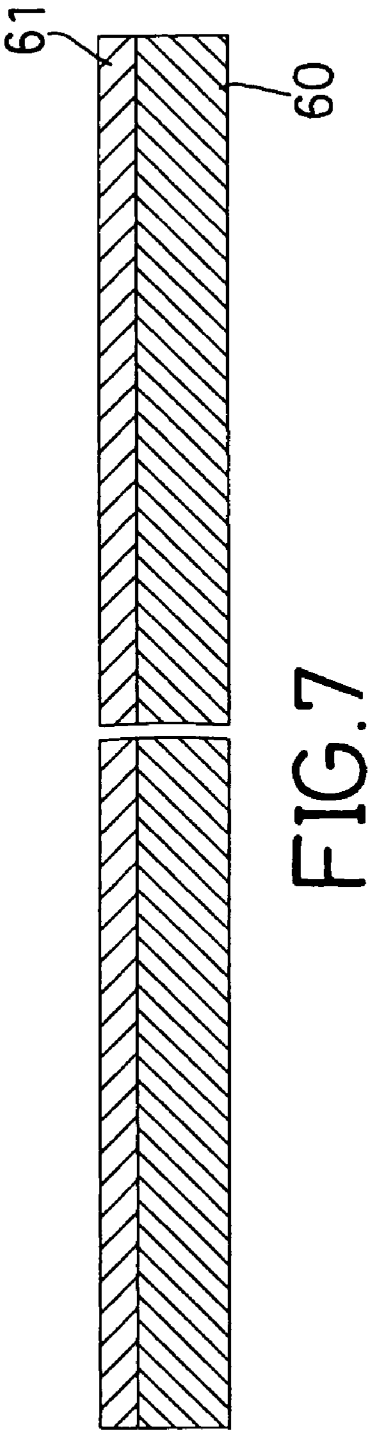
FIG.7 PRIOR ART
FIG. 7 is a cross sectional view of a first conventional pattern card.
Figure 8:
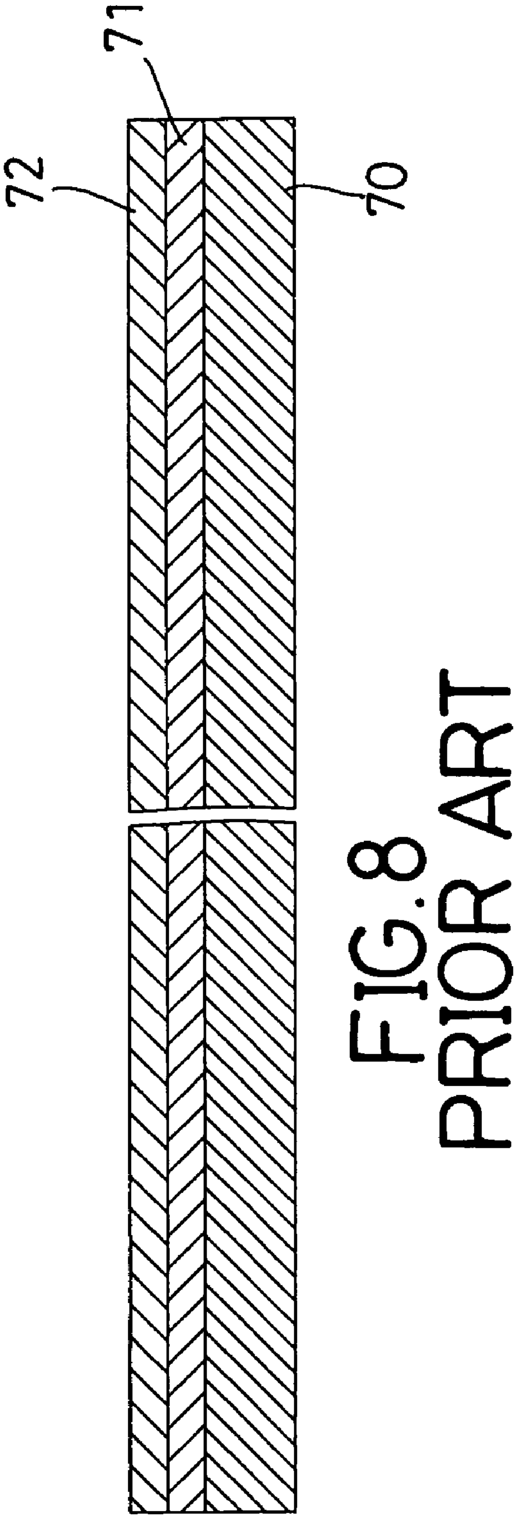
FIG.8 PRIOR ART
FIG. 8 is a cross sectional view of a second conventional pattern card.

With reference to FIGS. 5–6, in a further embodiment, the base material is composed of the paper sheet (10), a vacuum plating layer (30), and a plastic film (40). The wax layer (21), protection printing ink (22), and picture printing ink (23) are in turn provided on the plastic film (40). The protection printing ink (22) and picture printing ink (23) also can be mixed with wax in the proportion of 10%. When the protection printing ink (22) and picture printing ink (23) are removed, the picture appears on the plastic film (24). Alternatively, the picture printing ink (23) can be eliminated, and the user can freely draw on the protection printing ink (22).

The plastic film (40) can be a silver, gold, colorized or laser film formed on the vacuum plating layer (30).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pattern card comprising:

a base material having a paper sheet;

a color texture layer printed on the paper sheet;

a wax layer formed on the base material; and a protection printing ink coated on the wax layer.

2. The pattern card as claimed in claim 1 further comprising a picture printing ink partially coated on the protection printing ink according to a designed picture's profile and contour.

3. The pattern card as claimed in claim 1, wherein the base material has a vacuum plating layer and a plastic film.

4. The pattern card as claimed in claim 3, wherein the plastic film is a silver color plastic film.

5. The pattern card as claimed in claim 3, wherein the plastic film is a gold color plastic film.

6. The pattern card as claimed in claim 3, wherein the plastic film is a colorized plastic film.

7. The pattern card as claimed in claim 3, wherein the plastic film is a laser plastic film.

8. The pattern card as claimed in claim 1, wherein the protection printing ink is mixed with wax in the proportion of 10% wax.

9. The pattern card as claimed in claim 2, wherein the picture printing ink is mixed with wax in the proportion of 10% wax.

* * * * *